Jan. 4, 1949.  J. H. RICHARDSON  2,458,302
METHOD AND CHUCK FOR ASSEMBLING MOLD WALLS
Filed Feb. 8, 1946

Inventor.
John H. Richardson
By his Atty
John H. McKenna

Patented Jan. 4, 1949

2,458,302

UNITED STATES PATENT OFFICE 2,458,302

METHOD AND CHUCK FOR ASSEMBLING MOLD WALLS

John H. Richardson, Needham, Mass., assignor to Polaroid Corporation, Cambridge, Mass., a corporation of Delaware Application February 8, 1946, Serial No. 646,431

2 Claims. (Cl. 29—148.2)

This invention relates to improvements in the art of casting optical elements.

More particularly it relates to a method and apparatus for guiding a precise and accurate relative setting of the individual walls of a mold, and for maintaining the setting of the walls until they can be secured together as by solder or by any other suitable means.

In the manufacture of cast optical elements, such as prisms, for example, a suitable plastic material, usually an organic resin, is flowed into a mold formed of a plurality of plates assembled and secured together in a relation to define a particular desired shape of mold cavity. The mold plates have optically smooth surfaces so that an object or element cast in the mold will have correspondingly optically smooth surfaces. Usually the mold plates are of glass with the desired optically smooth surfaces on each side so that either side of a plate may constitute an interior surface of the assembled mold.

It will be obvious, from the nature of the optical elements which are to be cast, that extreme accuracy is requisite in the assembling of the mold walls or plates and that the plates temporarily must be securely held in their accurate relationships until they can be soldered or cemented together along their junctures. Also, it should be noted that, after each casting of an optical element in an assembled mold, it is requisite that the walls of the mold be separated again before attempting to remove the cast element. Otherwise the optically smooth surfaces of the cast element may become scratched or otherwise marred. Hence the casting of a succession of optical elements in a mold involves an assembling and dis-assembling of the mold plates for each element that is cast.

Heretofore great care and skill have been required to assemble such molds, and considerable time and labor have been involved to properly prepare a mold for each casting operation.

It is an object of the present invention to provide means whereby mold walls or plates may be more quickly and accurately assembled and temporarily maintained until they can be attached rigidly together in the desired mold form. I provide a chuck in the form of a mold core, and the mold walls or plates quickly and accurately may be positioned on exterior surfaces of the chuck and be held securely by the chuck until readily accessible junctures of plates have been soldered or cemented, after which the chuck may be removed from the mold cavity.

Another object is to provide a casting mold chuck having portions thereof which facilitate the accurate relative setting of mold plates on the chuck. A wall end or corner of the chuck may be utilized as a guide for the accurate setting of one edge of a plate, and each accurately positioned plate guides the quick and accurate setting of each subsequently positioned plate.

A further object is to provide a casting mold chuck having provision for pneumatic holding of mold plates on angularly related faces of the chuck, and including means for controlling the pneumatic effect. Each plate-holding surface of the chuck has a generally central shallow recess therein, and a valve-controlled conduit leading from a vacuum source opens into each said recess so that, when a plate is positioned over a said cavity, a vacuum chamber is thereby formed back of the plate and a partial vacuum in the chamber effectually holds the plate on the chuck.

It is, moreover, my purpose and object generally to improve upon prior devices and procedures for the assembly of casting molds, and especially molds for casting optical elements.

Figure 1:
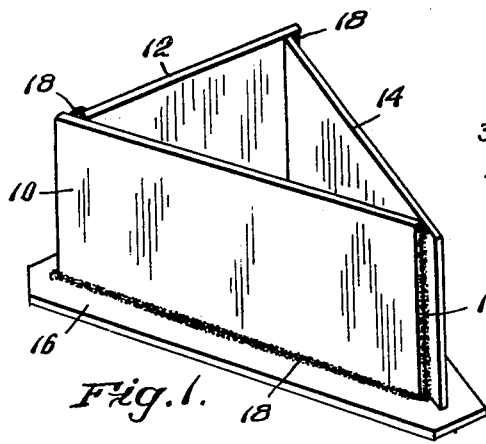
Figure 1 is a perspective of a known variety of assembled casting mold.
Figure 2:
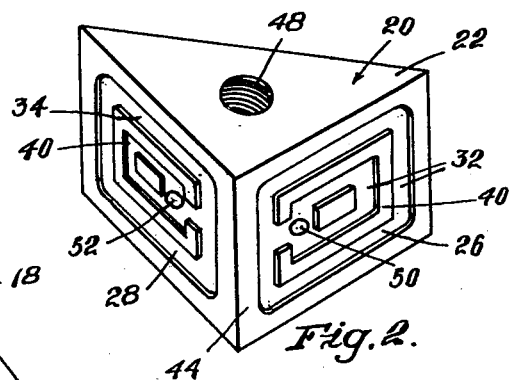
Figure 2 is a perspective of a chuck body embodying features of the present invention.
Figure 4:
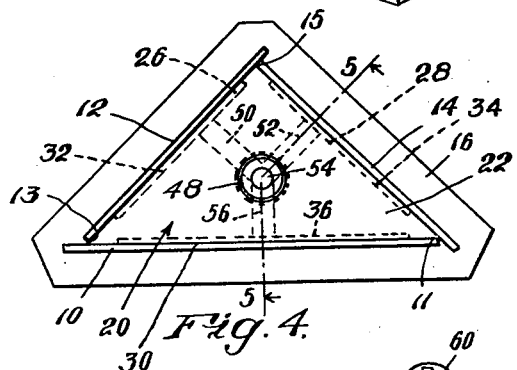
Figure 4 is a top plan of the chuck body of Figures 2 and 3 with mold plates assembled thereon.
Figure 3:
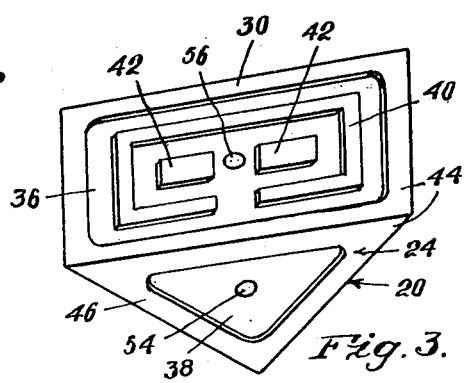
Figure 3 is a view similar to Figure 2 but showing the two sides of the chuck body which are concealed in Figure 2.
Figure 5:
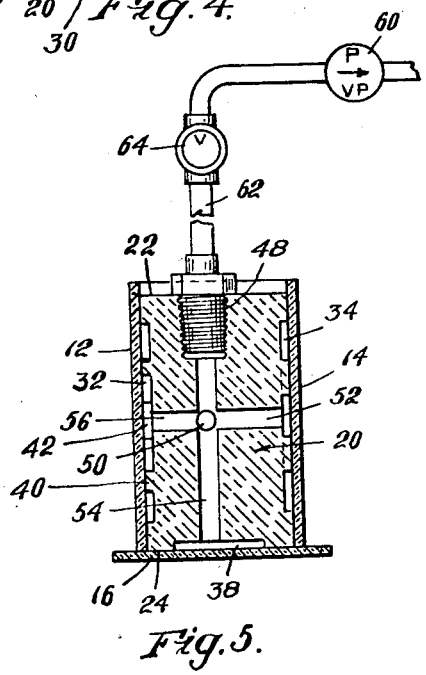
Figure 5 is a cross-sectional view approximately on line 5—5 of Figure 4.

Referring to the drawing, the illustrated embodiment of the invention, as applied in the casting of optical prisms, is representative of various related applications in which there exists a problem to accurately assemble and temporarily hold together a plurality of individual mold members in desired and precise relationships.

In Fig. 1, a known variety of prism mold is represented, consisting of the three side walls 10, 12 and 14 and the bottom or end wall 16, the top being open so that the material of which the prism is to be cast may be flowed into the mold in any suitable manner. Each wall may be a glass plate whose opposite faces are optically smooth, and the plates are secured together along their junctures, as by a suitable low melting point solder, or a suitable soluble cement, indicated at 18.

The invention has to do with apparatus for facilitating the accurate relative positioning of the plate walls of such a mold, and the holding of the assembled plates until the solder or cement 18 has been applied and set to secure the plates in their proper assembled relationships.

According to the invention, a chuck member or mold core-block 20 has shape and size generally corresponding to the desired cavity of any particular mold which is to be assembled. The block may be of any suitable material and, if made in one piece, will be of a material capable of providing hard, optically smooth exterior surfaces. However, if desired, the main body of the block may be of one material with exterior surface portions of another material applied to the body for providing the optically smooth hard surfaces. As herein shown, the block 20 is made in one piece in the form of a prism having the two ends 22, 24 and the three sides 26, 28 and 30, two of which sides are shown as being identical. The end 24 and all three sides 26, 28 and 30 constitute the plate-receiving faces of the block or chuck body against which the mold plates 10, 12, 14 and 16 are to be positioned and held. Each plate-receiving face of the chuck has a shallow cavity within its margin, indicated respectively at 32, 34, 36 and 38, and portions of the block material within the cavities may reach out to the plane of the margins of the respective surfaces, as indicated at 40, 42, thereby to constitute, with the marginal surface portions 44, 46, the areas of contact with the mold plates. In the block 20 as represented, only the surface areas 40, 42, 44 and 46 are required to be optically smooth.

The upper end 22 of block 20 has the interiorly threaded opening 48 therein, connecting the interior conduits 50, 52, 54 and 56, which open respectively into the shallow surface cavities 32, 34, 36 and 38.

Any suitable source of vacuum, such as a pump 60, may be connected through a conduit 62 to the opening 48 in the upper end of the block, whereby a pneumatic chuck is provided which effectively can hold mold plates against its lower end and each of its three sides. A control valve 64 may be provided in the conduit 62 having provision for selectively connecting conduit 62 through the valve to the pump 60 or through the valve to atmosphere for venting the chuck cavities.

In use, with valve 64 open to atmosphere, the block or chuck 20 may be arranged with its lower end 24 resting on the bottom mold plate 16, the latter plate being of size to project outward beyond the chuck on all sides. Then, any one of the other plates, say plate 10, for example, is positioned edgewise on a projecting part of the bottom plate and flatwise against the face or side 26 of the chuck. In placing plate 10, one of its ends 11 conveniently may be positioned precisely in registering alignment with one end 24 of the side 26 of the chuck with its other end projecting beyond the chuck. The chuck at this time may be connected or not to the vacuum source as may be desired. If the vacuum is connected, the suction effect on plate 10 will be relatively weak, due to two sides of the chuck continuing open to atmosphere, and plate 10 may be shifted easily to a proper setting. Preferably, though not necessarily, the chuck will be connected to the vacuum source when the plates 12 and 14 are being positioned on the chuck, so that the vacuum will be effective to hold the plates which already have been placed in position. As in the case of plate 10, each of plates 12 and 14 will be set with one end in registering alignment with one end of the wall on which it is to be placed. This may be accomplished quickly and accurately merely by arranging plate 12 against wall 28 with one end 13 set against the projecting end of plate 10 and with its opposite end projecting beyond the chuck. Similarly plate 14 is positioned on wall 30 with one end 15 set against the projecting end of plate 12 and with its other end projecting beyond the chuck.

The placing of a mold plate against a face of the chuck so that the plate rests flatwise against the marginal surface surrounding the cavity in that face, completes a chamber behind the plate whose only outlet is through the conduit 62. Hence, when valve 64 connects the conduit with pump 60, a partial vacuum is created behind the plate tending strongly to hold the plate in any particular set position on the chuck. After all of the plates have been properly and accurately placed on the chuck in succession, with suction or vacuum effective for holding them in their assembled relationships, the solder or cement 18 (Fig. 1) may be applied along the conveniently exposed junctures of plates to secure the plates rigidly together. Then the chuck may be vented to atmosphere and withdrawn from the mold cavity, leaving the assembled mold ready for a casting operation.

If solder is used to secure the plates together, it should be a low melting point solder which readily may be softened to separate the plates after each element has been cast in the mold and prior to removal of the cast element. In case a cement is employed it should be one which is readily soluble or whose holding power otherwise may be quickly and easily destroyed when it is desired to dis-assemble a mold.

Since certain changes in carrying out the above process, and certain modifications in the article which embody the invention may be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

I claim as my invention:

1. An assembling chuck for mold walls, comprising a core block having at least five sides, of which four sides constitute angularly related faces, each adapted to receive thereon one wall of a mold so that mold walls on the said four faces will enclose the core block on four sides thereof, each of said four faces of the core block having a separate cavity positioned to be covered by a said mold wall thereby to convert the cavity into a closed chamber behind the mold wall, and means for creating a partial vacuum in each said closed chamber for maintaining the mold walls in set positions on the chuck.

2. The method of assembling the walls of a mold for casting optical elements, comprising the steps of providing a core having five angularly related sides, two of which are generally parallel, arranging a mold wall on each side of the core excepting one of said generally parallel sides, creating a differential of pressure on the opposite sides of each mold wall with the pressure differential tending to maintain the walls against the core and in a predetermined relationship, rigidly securing the mold walls together in their said relationship, followed by equalizing the pressure on opposite sides of the mold walls to permit removal of the core through the open side of the mold.

JOHN H. RICHARDSON.

REFERENCES CITED

The following references are of record in the file of this patent:

UNITED STATES PATENTS

| Number | Name | Date |
|---|---|---|
| 893,000 | Loggie | July 14, 1908 |
| 1,316,273 | Clark | Sept. 16, 1919 |
| 1,957,709 | Haynes | May 8, 1934 |
| 2,311,525 | Ebbs | Feb. 16, 1943 |
| 2,366,935 | Schmid | Jan. 9, 1945 |
| 2,398,303 | Glassey | Apr. 9, 1946 |
| 2,406,401 | Richardson | Aug. 27, 1946 |
| 2,406,742 | Cooper, Jr. | Sept. 3, 1946 |